United States Patent
Kida et al.

(10) Patent No.: US 10,493,623 B2
(45) Date of Patent: Dec. 3, 2019

(54) COMMUNICATION CONTROL SYSTEM AND COMMUNICATION CONTROL METHOD

(71) Applicant: Kobe Steel, Ltd., Kobe-shi (JP)

(72) Inventors: Naoki Kida, Fujisawa (JP); Shuichi Inada, Fujisawa (JP); Tsutomu One, Fujisawa (JP); Takashi Wada, Kobe (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 183 days.

(21) Appl. No.: 15/544,701

(22) PCT Filed: Jan. 4, 2016

(86) PCT No.: PCT/JP2016/050047
§ 371 (c)(1),
(2) Date: Jul. 19, 2017

(87) PCT Pub. No.: WO2016/129294
PCT Pub. Date: Aug. 18, 2016

(65) Prior Publication Data
US 2018/0272528 A1 Sep. 27, 2018

(30) Foreign Application Priority Data
Feb. 12, 2015 (JP) .................. 2015-025586

(51) Int. Cl.
*G05B 19/042* (2006.01)
*B25J 9/16* (2006.01)
(Continued)

(52) U.S. Cl.
CPC ............ *B25J 9/161* (2013.01); *G05B 19/042* (2013.01); *G05B 19/0423* (2013.01);
(Continued)

(58) Field of Classification Search
None
See application file for complete search history.

(56) References Cited

U.S. PATENT DOCUMENTS 4,726,013 A 2/1988 Kawashima et al.
5,166,491 A 11/1992 Izume et al.
(Continued)

FOREIGN PATENT DOCUMENTS

| JP | 62-131692 A | 6/1987 |
| JP | 2008-66854 A | 3/2008 |
| JP | 2012-170036 A | 9/2012 |

OTHER PUBLICATIONS

International Search Report dated Mar. 15, 2016 in PCT/JP2016/050047 filed Jan. 4, 2016.
(Continued)

*Primary Examiner* — K. Wong
(74) *Attorney, Agent, or Firm* — Oblon, McClelland, Maier & Neustadt, L.L.P.

(57) ABSTRACT

A control device connected to one or more to-be-controlled devices via a network includes: a storage that stores information of a synchronization period of a time interval for synchronization with the to-be-controlled devices, and communication periods of plural time intervals established in the synchronization period; a calculator that calculates, for each of the to-be-controlled devices, a control instruction instructing the to-be-controlled device to operate in synchronization; and a communication controller that performs, based on the information stored in the storage, a control such that the control instruction is transmitted and received between the control device and each of the to-be-controlled devices during the synchronization period, the communication controller allocating a respective control instruction corresponding to each of the to-be-controlled devices to at least one of the communication periods established in the (Continued)

synchronization period, thereby transmitting/receiving data including the allocated control instruction for each communication period.

16 Claims, 13 Drawing Sheets

(51) Int. Cl.
*G05B 19/418* (2006.01)
*H04L 7/00* (2006.01)
*B25J 15/00* (2006.01)

(52) U.S. Cl.
CPC ........ *G05B 19/4185* (2013.01); *H04L 7/0008* (2013.01); *B25J 15/0019* (2013.01); *G05B 2219/45104* (2013.01); *Y02P 90/18* (2015.11); *Y10S 901/06* (2013.01); *Y10S 901/42* (2013.01)

(56) References Cited

U.S. PATENT DOCUMENTS

| | | | |
|---|---|---|---|
| 6,315,186 B1 | 11/2001 | Friedl et al. | |
| 6,738,388 B1 | 5/2004 | Stevenson et al. | |
| 8,005,553 B2* | 8/2011 | Enver | G05B 19/042 700/19 |
| 9,840,008 B2* | 12/2017 | Komatsu | B25J 9/1682 |
| 9,841,749 B2* | 12/2017 | Linnell | G05B 19/409 |
| 2002/0131454 A1 | 9/2002 | Franke et al. | |
| 2004/0213285 A1 | 10/2004 | Stevenson et al. | |
| 2006/0083258 A1 | 4/2006 | Kwon et al. | |
| 2008/0249641 A1 | 10/2008 | Enver et al. | |

OTHER PUBLICATIONS

Extended European Search Report dated Sep. 5, 2018 in Patent Application No. 16748939.2, 8 pages.

* cited by examiner

COMMUNICATION CONTROL SYSTEM AND COMMUNICATION CONTROL METHOD

TECHNICAL FIELD

The present invention relates to a communication control system and a communication control method.

BACKGROUND ART

An industrial robot used in welding, for example, typically operates in synchronization with peripheral devices, such as a welding power supply, a positioner, and a slider. As the method for synchronization, a method in which communication control is performed over a network using, for example, RS-232C, RS-485, RS-422, Ethernet (registered trademark), or CAN (Controller Area Network) (registered trademark) is used.

As an example of the related art for synchronization between devices, PTL 1 describes a communication control device for communicating with one or more control devices over a network, including a non-periodic transmission unit that generates a transmission request at a given time, a periodic transmission unit that generates a transmission request at regular intervals, a communication unit that communicates transmission data of the non-periodic transmission unit and transmission data of the periodic transmission unit to the network, and a scheduling unit that transmits transmission content from the periodic transmission unit to the communication unit, computes a communication processing time taken to perform a communication process by the non-periodic transmission unit having a transmission request, obtains a remaining time in the regular interval of the periodic transmission unit, compares the communication processing time with the remaining time, and transmits transmission content from the non-periodic transmission unit to the communication unit.

CITATION LIST

Patent Literature

PTL 1: Japanese Unexamined Patent Application Publication No. 2012-170036

SUMMARY OF INVENTION

Technical Problem

In order to allow a plurality of devices to synchronously operate, data is usually transmitted and received between the devices. The use of a multi-axis industrial robot having a large number of joints or an increase in the number of devices that are to be synchronized, for example, may result in an increase in the amount of data that is transmitted and received for synchronization. However, the amount of data that can be transmitted and received in a single communication operation is typically limited. Accordingly, if the amount of data that is transmitted and received for synchronization increases, it might not be possible to transmit or receive the data in a single synchronization communication operation, resulting in unsuccessful synchronization between the devices. Note that the technique described in PTL 1 is not a technique for a case where the amount of data that is transmitted and received for synchronization is large.

An object of the present invention is to allow a plurality of devices to synchronously operate even in a case where data that is transmitted and received for the devices to synchronously operate exceeds an amount that can be transmitted and received in a single communication operation.

Solution to Problem

In view of the above-described object, the present invention provides a communication control system including: a control device; and one or more control target devices connected to the control device over a network. The control device includes: storage means for storing information about synchronization intervals, which are periods for synchronization with the control target devices, and about a plurality of communication intervals, which are periods set in each of the synchronization intervals; computation means for computing control instructions for the respective control target devices for instructing the control target devices to synchronously operate; and communication control means for performing control so as to transmit to and receive from the control target devices the control instructions in each of the synchronization intervals, allocating each of the control instructions respectively corresponding to the control target devices to at least one communication interval among the plurality of communication intervals set in each of the synchronization intervals, and transmitting and receiving, in each of the communication intervals, data that includes a corresponding one or more of the allocated control instructions, on the basis of the information stored in the storage means.

Here, the control target devices may include at least one industrial robot that is used in welding and at least one welding power supply, and the communication control means may perform transmission and reception of the control instructions respectively corresponding to the industrial robot and the welding power supply in all of the plurality of communication intervals set in each of the synchronization intervals.

Further, the communication control means may transmit to and receive from the control target devices the corresponding one or more of the allocated control instructions in each of the communication intervals at timings that are within a first section or a second section among three sections obtained by equally dividing each of the communication intervals into three parts.

Further, the synchronization intervals may each have a length equal to or shorter than 10 msec, and the communication intervals may each have a length equal to or shorter than 5 msec.

Further, the communication control system may further include a branch device that is provided between the control device and the control target devices on the network and transmits the data transmitted from the communication control means of the control device to the control target devices sequentially.

Further, the network may be constituted by a wired network.

Further, from another point of view, the present invention provides a communication control method for allowing a control device and one or more control target devices to perform communication with each other and to be synchronized with each other, the method including the steps of: computing control instructions for the respective control target devices for instructing the control target devices to synchronously operate; performing control so as to transmit to and receive from the control target devices the control instructions in each synchronization interval that is determined in advance as a period for synchronization between the control device and the control target devices; allocating each of the control instructions respectively corresponding to the control target devices to at least one communication interval among a plurality of communication intervals, which are periods set in each synchronization interval; and transmitting and receiving, in each of the communication intervals, data that includes a corresponding one or more of the allocated control instructions.

Advantageous Effects of Invention

According to the present invention, it is possible to allow a plurality of devices to synchronously operate even in a case where data that is transmitted and received for the devices to synchronously operate exceeds an amount that can be transmitted and received in a single communication operation.

DESCRIPTION OF EMBODIMENTS

Hereinafter, an embodiment of the present invention is described in detail with reference to the attached drawings.

<System Configuration>

Figure 1:
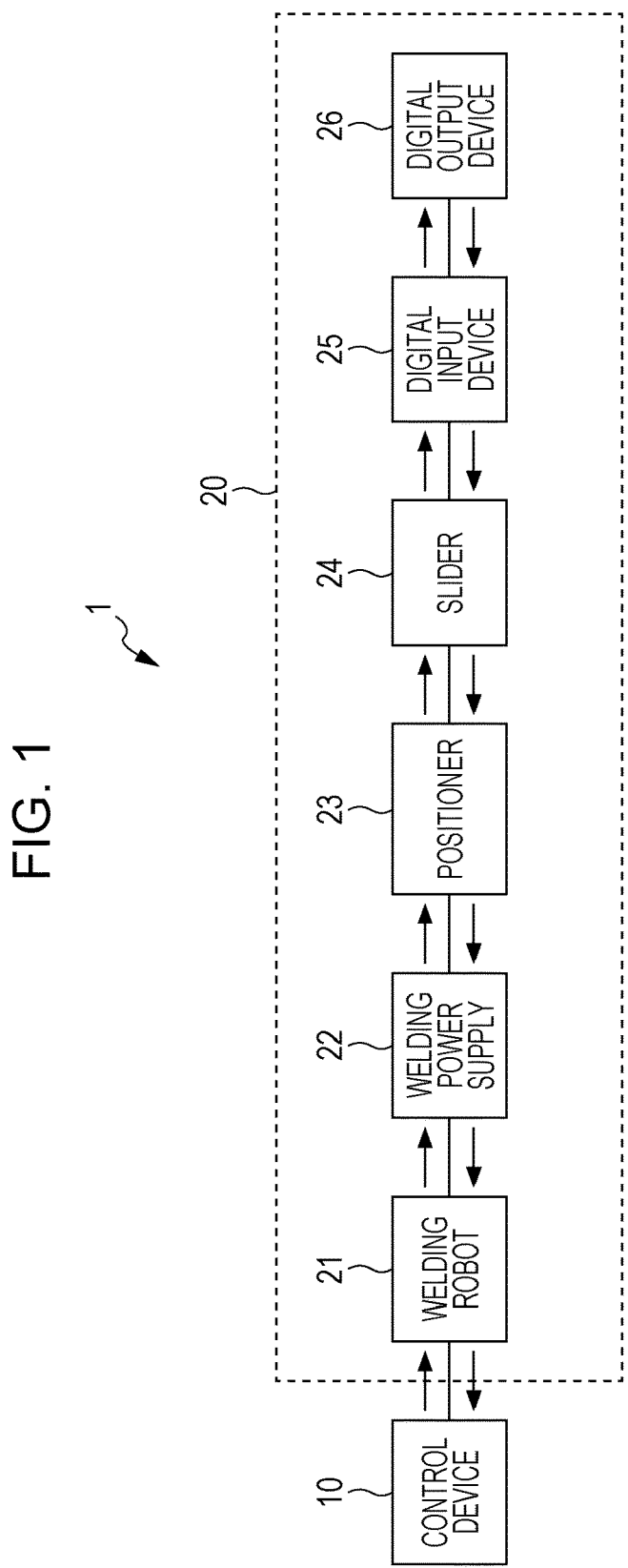
FIG. 1 is a diagram schematically illustrating an exemplary configuration of a welding system according to the present embodiment.

First, a welding system 1 according to the present embodiment including a communication control system of the present invention is described. FIG. 1 is a diagram schematically illustrating an exemplary configuration of the welding system 1 according to the present embodiment.

As illustrated in FIG. 1, the welding system 1 according to the present embodiment includes a control device 10, a welding robot 21, a welding power supply 22, a positioner 23, a slider 24, a digital input device 25, and a digital output device 26. Here, the control device 10 functions as a master, and the other devices, namely, the welding robot 21, the welding power supply 22, the positioner 23, the slider 24, the digital input device 25, and the digital output device 26 function as slaves. The welding system 1 is configured such that a frame transmitted from the master passes through all of the slaves sequentially, goes back over the slaves, and returns to the master to thereby allow the master and the slaves to synchronously operate.

Hereinafter, the welding robot 21, the welding power supply 22, the positioner 23, the slider 24, the digital input device 25, and the digital output device 26 may be referred to as slave devices 20 in a case where these devices need not be distinguished from each other. Further, in the present embodiment, the slave devices 20 are used as examples of control target devices.

Further, in the present embodiment, description is given under the assumption that wired communication is performed on a network and that EtherCAT (registered trademark) is used as the communication method; however, the present embodiment is not limited to such a configuration. In the present embodiment, the type of communication method need not be limited to EtherCAT, and wired communication or wireless communication may be used.

The control device 10 is a device that controls processing in the welding system 1 and generates control instructions for instructing the slave devices 20 to synchronously operate. Here, the control device 10 generates a control instruction for each of the slave devices 20, stores the generated control instructions in a frame, and transmits the frame to the slave devices 20. That is, in a frame (hereinafter referred to as a control instruction frame) that is transmitted by the control device 10 as control instructions for the slave devices 20, control instruction data for the welding robot 21 and control instruction data for the welding power supply 22, for example, are stored.

For the control device 10 to transmit a control instruction frame, periods (hereinafter referred to as synchronization intervals) for synchronization between the control device 10 and the slave devices 20 are specified in advance. Further, communication intervals, which are periods obtained by dividing each synchronization interval, are specified in advance. That is, in each of the synchronization intervals, a plurality of communication intervals, each of the communication intervals being shorter than the synchronization interval, are set, and each of the synchronization intervals has a length that is equal to or longer than that of two communication intervals.

Here, the format of a frame that is transmitted and received for a synchronous operation in the welding system 1 is defined in the communication method, such as EtherCAT, for example, and the maximum capacity of a frame that can be transmitted and received at once (for example, 1500 bytes) is specified. Therefore, if a control instruction frame having a number of bytes that exceeds the maximum capacity is transmitted, the control instruction frame is discarded at a device on the receiving side, for example, resulting in unsuccessful data transmission and reception.

Also in the present embodiment, if the control device 10 attempts to store control instructions for all of the slave devices 20 in a single control instruction frame, the number of bytes of the control instruction frame exceeds the specified maximum frame capacity.

Accordingly, the control device 10 does not transmit control instructions for all of the slave devices 20 in a single communication interval at once in a concentrated manner but distributes the control instructions for the slave devices 20 among the plurality of communication intervals set in the synchronization interval so that the number of bytes of the frame is within the maximum frame capacity. The control device 10 generates and transmits a control instruction frame in each communication interval.

For example, in a first communication interval in a synchronization interval, the control device 10 stores control instruction data for the welding robot 21, control instruction data for the welding power supply 22, and control instruction data for the digital output device 26 in a control instruction frame and transmits the control instruction frame. Subsequently, in a second communication interval in the synchronization interval, the control device 10 stores control instruction data for the welding robot 21, control instruction data for the welding power supply 22, control instruction data for the positioner 23, and control instruction data for the slider 24, for example, in a control instruction frame and transmits the control instruction frame. Note that in order for the control device 10 to be in synchronization with all of the slave devices 20, a control instruction for each of the slave devices 20 is allocated to at least one communication interval among the plurality of communication intervals set in the synchronization interval and transmitted.

The control device 10 transmits a clock signal in each synchronization interval to notify the slave devices 20 of a synchronization timing. The control device 10 performs a process of transmitting such a clock signal and control instruction frames in each synchronization interval repeatedly to thereby perform control for synchronization with the slave devices 20.

Next, the slave devices 20 are described.

The welding robot 21 includes an arm having a plurality of joints and performs various operations related to welding. At the distal end of the arm of the welding robot 21, a welding torch used to perform a welding operation for a workpiece is provided.

The welding power supply 22 supplies power to an electrode (for example, a welding wire) held by the welding torch of the welding robot 21. When the welding power supply 22 supplies power, an electrical arc is produced at the electrode of the welding torch provided on the welding robot 21.

The positioner 23 adjusts the position of a workpiece.

The slider 24 is disposed under the welding robot 21 for moving the welding robot 21. The digital input device 25 is, for example, a keyboard or a touch panel display and receives external digital data input.

The digital output device 26 is a display device having a display, for example, and externally outputs digital data.

When each of the slave devices 20 receives a control instruction frame in which control instruction data (hereinafter, control instruction data generated by the control device 10 is referred to as command data) addressed thereto is stored, the slave device 20 obtains the command data addressed thereto stored in the control instruction frame. Further, each of the slave devices 20 assumes the reception interval of the clock signal to be the synchronization interval and, at each timing when the slave device 20 receives the clock signal, performs an operation while reflecting a control instruction indicated by command data that has been obtained in the single synchronization interval.

Further, when each of the slave devices 20 receives a control instruction frame in which command data addressed thereto is stored, the slave device 20 generates data that includes content for feeding back the operation state thereof at the time point of reception (that is, the result of performing the control instruction at the time point of reception) (hereinafter, the data generated for indicating the result of performing the control instruction is referred to as monitor data). Then, the slave device 20 stores the generated monitor data in the control instruction frame by replacing the command data addressed thereto with the generated monitor data and transmits the control instruction frame to the control device 10.

Accordingly, a control instruction frame is transmitted from the control device 10 to the slave devices 20 and is received by all of the slave devices 20. Thereafter, the control instruction frame goes back, passes through all of the slave devices 20, and returns to the control device 10 last. Then, the control device 10 obtains monitor data, from the slave devices 20, stored in the returned control instruction frame. Command data and monitor data are exchanged between the control device 10 and the slave devices 20 to thereby enable synchronization control by the control device 10.

<Functional Configuration of Control Device>

Figure 2:
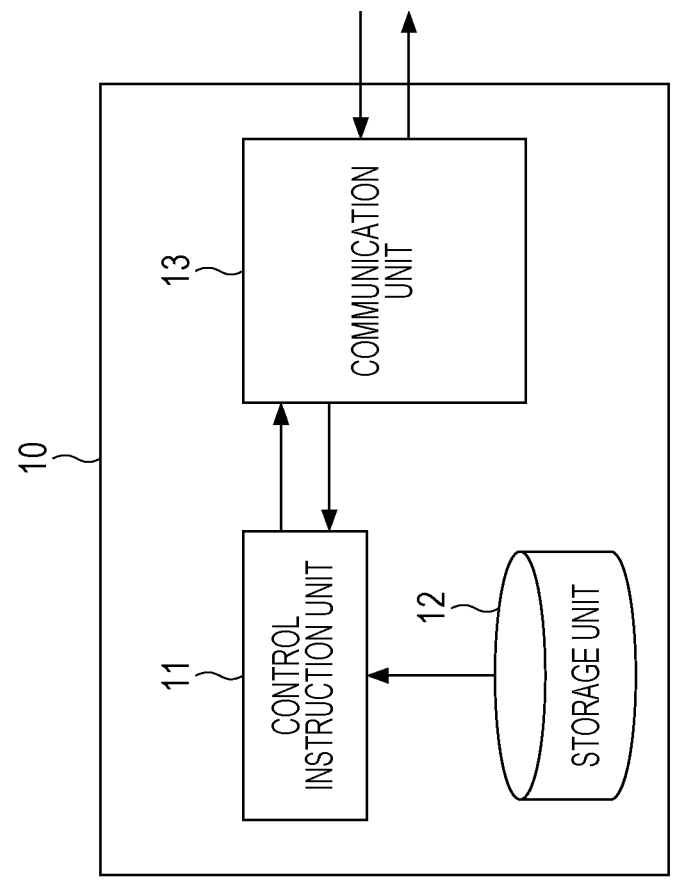
FIG. 2 is a block diagram illustrating an exemplary functional configuration of a control device according to the present embodiment.

Now, the functional configuration of the control device 10 according to the present embodiment is described. FIG. 2 is a block diagram illustrating an exemplary functional configuration of the control device 10 according to the present embodiment. The control device 10 includes a control instruction unit 11 that generates control instructions for the slave devices 20 and outputs a control instruction frame, a storage unit 12 that stores information regarding the synchronization intervals and the communication intervals, and a communication unit 13 that performs data transmission and reception with the slave devices 20.

The control instruction unit 11 computes a specified value for specifying an operation of each of the slave devices 20 and generates command data. Then, the control instruction unit 11 transmits a control instruction frame in which the generated command data is stored to the slave devices 20 via the communication unit 13. The control instruction unit 11 receives the control instruction frame that returns after passing through the slave devices 20 from the communication unit 13, obtains monitor data stored in the received control instruction frame, and recognizes the results of processing by the slave devices 20. Further, the control instruction unit 11 transmits the clock signal to the slave devices 20 in each synchronization interval.

Further, the control instruction unit 11 transmits an instruction for parameter setting, parameter correction, and so on for parameters used in operations of the slave devices 20 to the slave devices 20 before transmitting the clock signal or a control instruction frame to the slave devices 20. The instruction transmitted here is not a periodic instruction that is transmitted at regular intervals, that is, in each synchronization interval or in each communication interval, for example, but an instruction that is non-periodically transmitted, and is transmitted by using extra time in the synchronization interval or in the communication intervals. Hereinafter, such communication that is performed for parameter setting and so on for the slave devices 20 is referred to as non-periodic communication, and communication performed in the synchronization interval or in the communication intervals after non-periodic communication is referred to as periodic communication. In the present embodiment, the control instruction unit 11 is used as an example of computation means and communication control means.

The storage unit 12 stores a database (hereinafter referred to as a synchronization DB) in which information regarding the synchronization intervals and the communication intervals is specified. In the synchronization DB, the time length of the synchronization intervals and that of the communication intervals, the timings of the communication intervals in each synchronization interval at which command data addressed to each of the slave devices 20 is transmitted, the position in a control instruction frame at which command data addressed to each of the slave devices 20 is stored, and other information are stored. The information in the synchronization DB is used when the control instruction unit 11 transmits the clock signal and a control instruction frame in periodic communication. In the present embodiment, the storage unit 12 is used as an example of storage means.

The communication unit 13 performs data transmission and reception in periodic communication and non-periodic communication. For example, in periodic communication, the communication unit 13 transmits a control instruction frame generated by the control instruction unit 11 from the control device 10 to the slave devices 20. Further, the communication unit 13 receives a control instruction frame that returns after passing through the slave devices 20, and outputs the received control instruction frame to the control instruction unit 11.

<Hardware Configuration of Control Device>

Figure 3:
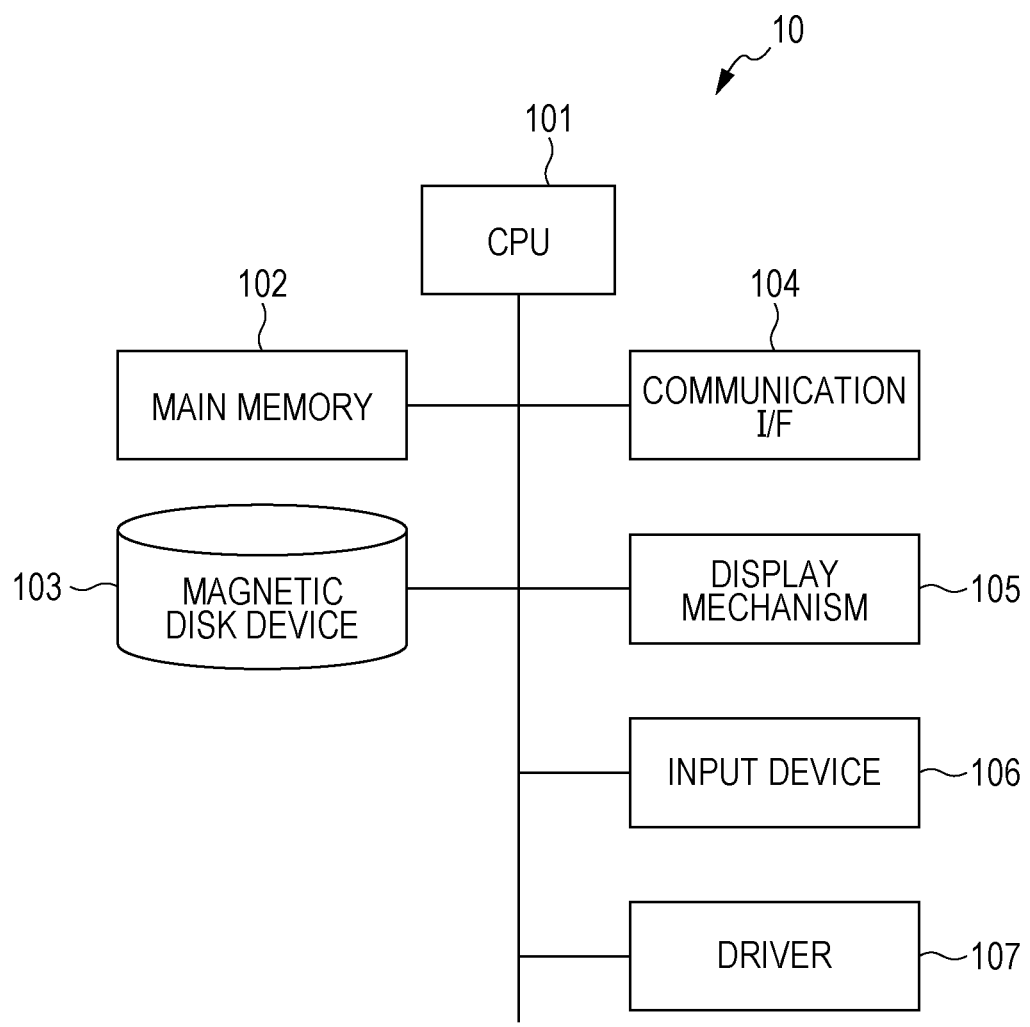
FIG. 3 is a diagram illustrating an exemplary hardware configuration of the control device.

Now, the hardware configuration of the control device 10 is described. FIG. 3 is a diagram illustrating an exemplary hardware configuration of the control device 10.

As illustrated in FIG. 3, the control device 10 is implemented by using a general-purpose PC (personal computer), for example, and includes a CPU 101, and a main memory 102 and a magnetic disk device (HDD: hard disk drive) 103, which are storage areas. Here, the CPU 101 executes various programs, such as an OS (operating system) and application software, to implement the functions of the control device 10. The main memory 102 is a storage area for storing various programs, data used when the programs are executed, and so on. The HDD (magnetic disk device) 103 is a storage area for storing input data for various programs, output data from various programs, and so on.

The control device 10 further includes a communication I/F 104 for external communication, a display mechanism 105 constituted by a video memory, a display, and so on, an input device 106, such as a keyboard or a mouse, and a driver 107 for data reading/writing from/to a storage medium.

When the CPU 101 executes various programs, such as the OS and application software, for example, the functions of the control instruction unit 11 in the control device 10 are implemented. The storage unit 12 is implemented by using the HDD 103, for example. Further, the communication unit 13 is implemented by using the communication I/F 104, for example. However, FIG. 3 only illustrates an exemplary hardware configuration, and the configuration of the control device 10 is not limited to the illustrated configuration. Note that a program for implementing an embodiment of the present invention can be provided by storing the program in a magnetic disk, an optical disk, a semiconductor memory, or a recording medium of any other type for distribution or by delivering the program over a network.

<Processing Procedure for Communication>

Figure 4:
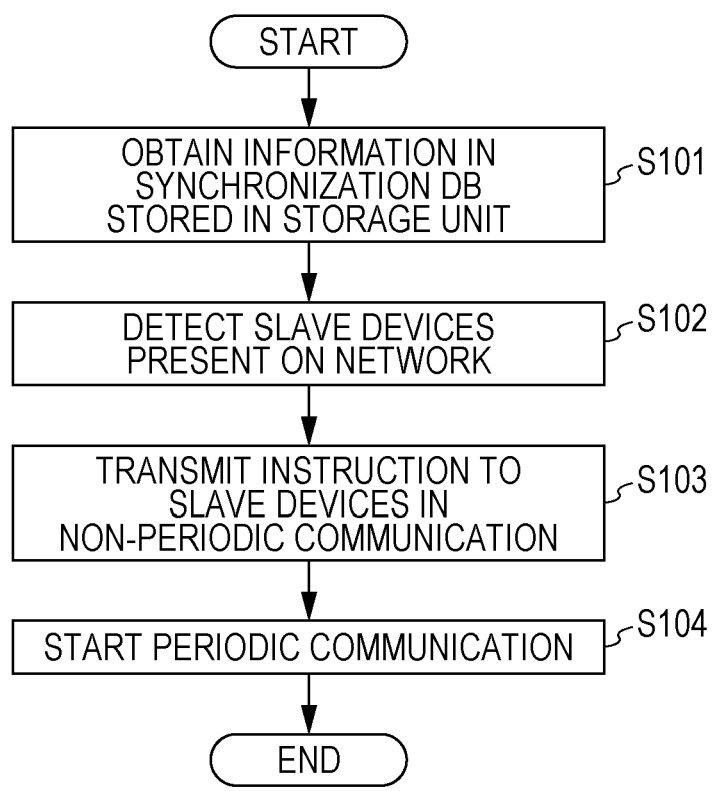
FIG. 4 is a flowchart illustrating an exemplary processing procedure for communication performed in the welding system.

Now, a processing procedure for communication performed in the welding system 1 is described. FIG. 4 is a flowchart illustrating an exemplary processing procedure for communication performed in the welding system 1.

First, when an operator turns on the power of the control device 10, the control instruction unit 11 of the control device 10 obtains information in the synchronization DB stored in the storage unit 12 (step 101). Next, the control instruction unit 11 detects the slave devices 20 present on a network within the welding system 1 (step 102). Here, for detecting the slave devices 20, information regarding the slave devices 20, such as the IP addresses of the slave devices 20, is stored in advance in the synchronization DB, for example. The control instruction unit 11 transmits data to the network to detect the order in which the slave devices 20 respectively having the predetermined IP addresses are arranged on the network.

Subsequently, the control instruction unit 11 transmits an instruction to the slave devices 20 via the communication unit 13 in non-periodic communication in order to perform parameter setting and parameter correction for the detected slave devices 20 (step 103). After parameter setting and correction for the slave devices 20 have been performed in accordance with the instruction transmitted in the non-periodic communication, the control instruction unit 11 starts periodic communication (step 104).

In the periodic communication, the control instruction unit 11 generates a clock signal in each synchronization interval on the basis of the information in the synchronization DB obtained in step 101 and transmits the clock signal to the slave devices 20. Further, the control instruction unit 11 generates command data for each of the slave devices 20. Then, the control instruction unit 11 allocates the command data corresponding to each of the slave devices 20 to at least one communication interval among the communication intervals in the synchronization interval on the basis of the information in the synchronization DB and transmits a control instruction frame that includes the allocated command data in each communication interval.

The control instruction unit 11 receives the control instruction frame that returns after passing through all of the slave devices 20, and recognizes the results of processing by the slave devices 20 on the basis of monitor data stored in the control instruction frame. Such transmission and reception of a control instruction frame are performed in each communication interval, which forms a process for a single synchronization interval. Further, the process for a single synchronization interval is repeatedly performed to thereby control the slave devices 20 so that the slave devices 20 synchronously operate.

<Description of Control Instruction Frames Transmitted in Periodic Communication>

Figure 5:
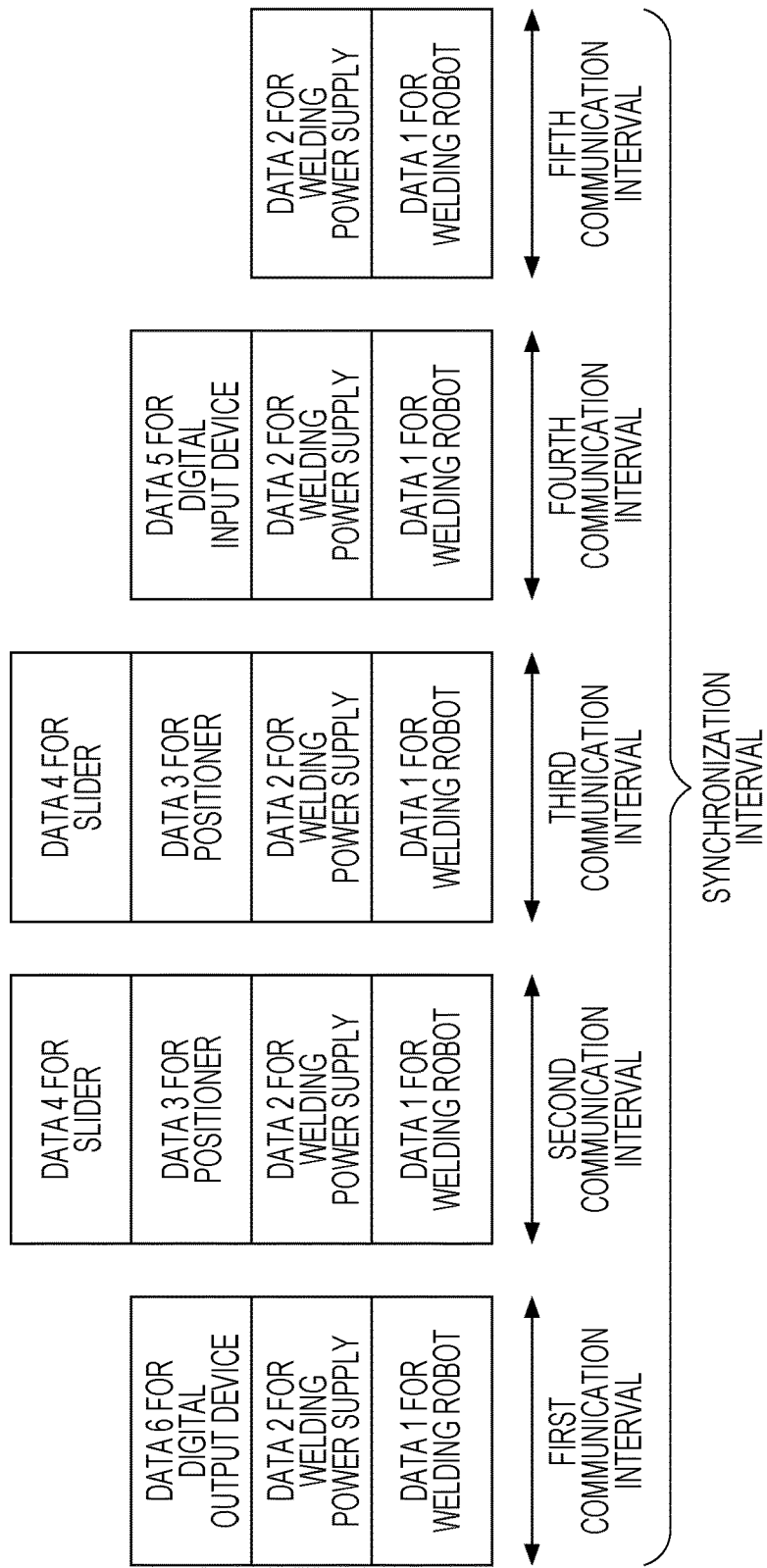
FIG. 5 is a diagram for describing exemplary control instruction frames that are transmitted to slave devices by the control device in periodic communication.
Figure 6:
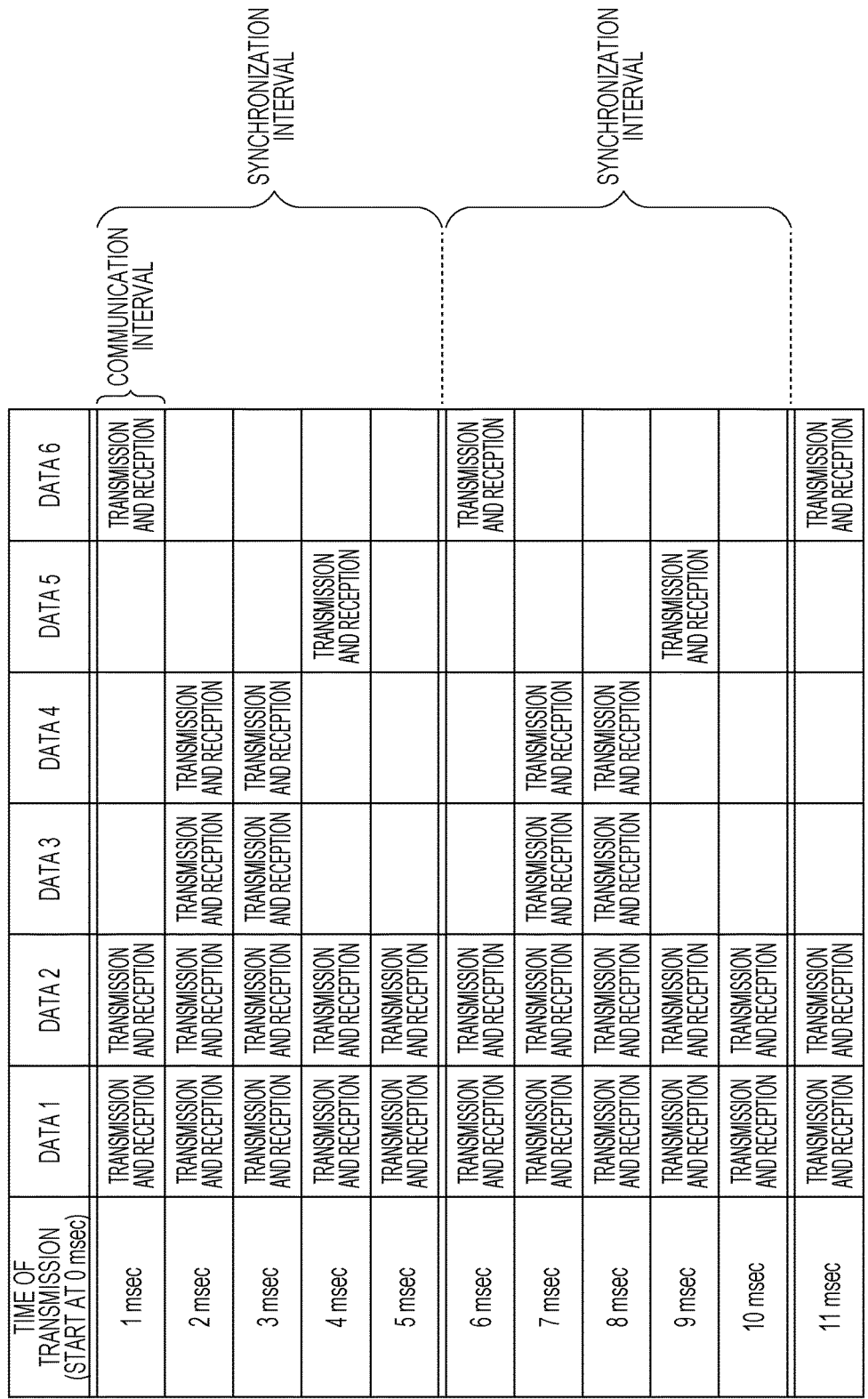
FIG. 6 is a diagram for describing exemplary control instruction frames that are transmitted to slave devices by the control device in periodic communication.

Now, control instruction frames transmitted to the slave devices 20 by the control device 10 in periodic communication are described. FIG. 5 and FIG. 6 are diagrams for describing exemplary control instruction frames that are transmitted to the slave devices 20 by the control device 10 in periodic communication. In the examples illustrated in FIG. 5 and FIG. 6, the synchronization interval is divided into five intervals, and five communication intervals are included in the synchronization interval. Further, it is assumed that the synchronization interval is preset to 5 msec and that each of the communication intervals is preset to 1 msec.

As illustrated in FIG. 5, data 1 to data 6 are pieces of data that are generated for the slave devices 20 respectively as pieces of command data that are addressed to the slave devices 20. Here, data 1 is data for the welding robot 21, data 2 is data for the welding power supply 22, and data 3 is data for the positioner 23. Further, data 4 is data for the slider 24, data 5 is data for the digital input device 25, and data 6 is data for the digital output device 26.

The control device 10 allocates data 1 to data 6, which are pieces of data addressed to the slave devices 20, to the communication intervals and transmits data 1 to data 6 on the basis of the synchronization DB stored in the storage unit 12. In the example illustrated in FIG. 5, data 1, data 2, and data 6 are transmitted in a first communication interval. In a second communication interval, data 1, data 2, data 3, and data 4 are transmitted. In a third communication interval, data 1, data 2, data 3, and data 4 are transmitted as in the second communication interval. In a fourth communication interval, data 1, data 2, and data 5 are transmitted. In a fifth communication interval, which is the last one, data 1 and data 2 are transmitted.

That is, data 1 for the welding robot 21 and data 2 for the welding power supply 22 are transmitted and received in all of the five communication intervals. Data 3 for the positioner 23 and data 4 for the slider 24 are transmitted and received in the second and third communication intervals among the five communication intervals. Further, data 5 for the digital input device 25 is transmitted and received in the fourth communication interval, and data 6 for the digital output device 26 is transmitted and received in the first communication interval.

Specifically, as illustrated in FIG. 6, it is assumed that the start time of periodic communication corresponds to "0 msec". Then, a control instruction frame that stores data 1, data 2, and data 6 is transmitted 1 msec after the start of transmission. Similarly, as the process performed in the same synchronization interval, a control instruction frame is transmitted 2 msec after the start of transmission, 3 msec after the start of transmission, 4 msec after the start of transmission, and 5 msec after the start of transmission. When transmission and reception of a control instruction frame are performed in the fifth communication interval 5 msec after the start of transmission, one synchronization interval ends. Then, the next synchronization interval starts. That is, in the first communication interval of the next synchronization interval 6 msec after the start of transmission, a control instruction frame that stores data 1, data 2, and data 6 is transmitted.

Accordingly, pieces of data for a synchronous operation are allocated to the communication intervals to thereby perform data transmission and reception such that each control instruction frame does not exceed the maximum frame capacity that can be transmitted and received at once. For a synchronous operation between the control device 10 and the slave devices 20, data for each of the slave devices 20 needs to be transmitted and received in at least one communication interval among the plurality of communication intervals in a single synchronization interval. That is, in the example illustrated in FIG. 6, each of data 1 to data 6 needs to be transmitted and received in at least one communication interval among the divided five communication intervals.

Each of the slave devices 20 performs an operation by reflecting command data that has been obtained in the single synchronization interval at each timing when the slave device 20 receives the clock signal. In a case where a plurality of pieces of command data have been obtained, the last one among the obtained pieces of command data is reflected. That is, in a case where the slave device 20 receives a plurality of pieces of command data in a single synchronization interval, the slave device 20 reflects a piece of command data received last in the synchronization interval.

In the example illustrated in FIG. 6, pieces of command data are transmitted to the welding robot 21 and the welding power supply 22 in all of the five communication intervals in each synchronization interval, and therefore, the content of the pieces of command data transmitted in the fifth communication interval, which is the last one, is reflected. That is, when receiving command data in each of the first to fourth communication intervals, each of the welding robot 21 and the welding power supply 22 stores monitor data that indicates the operation state at the time point of reception in the control instruction frame, and transmits the control instruction frame to the control device 10; however, the pieces of command data received in the first to fourth communication intervals are not used consequently in an operation that is performed.

Similarly, pieces of command data are transmitted to the positioner 23 and the slider 24 in each of the second and third communication intervals in each synchronization interval, and therefore, the content of the pieces of command data transmitted in the third communication interval is reflected.

Further, in a case where transmission and reception of a piece of command data are not successfully performed due to generation of noise or the like, the immediately preceding piece of command data in the same synchronization interval is used. For example, in a case where transmission and reception of command data are not successfully performed in the welding robot 21 in the fifth communication interval, the content of command data transmitted and received in the immediately preceding communication interval, namely, the fourth communication interval, is reflected. Accordingly, transmission and reception of command data are performed in two or more communication intervals in a single synchronization interval. As a result, command data is obtained more securely and synchronization control is performed more reliably than in a configuration in which transmission and reception of command data are performed in only one communication interval in a single synchronization interval.

Further, from the viewpoints of increased stability of arc tracking and increased precision of touch sensing, for example, it is preferable that the synchronization intervals and the communication intervals be short. Here, arc tracking is a function used in a welding operation for, even if a deviation from a taught trajectory of the weld line occurs, keeping the position of the distal end of the welding torch relative to the weld line unchanged and preventing the target position of the welding torch from being deviated from the groove. Touch sensing is a function in which a voltage is applied between a workpiece and the welding wire, a voltage drop phenomenon that occurs upon the welding wire coming into contact with the workpiece is used to detect the position of the workpiece, and the position of the welding robot 21 is corrected on the basis of the detected position of the workpiece.

Figure 7:
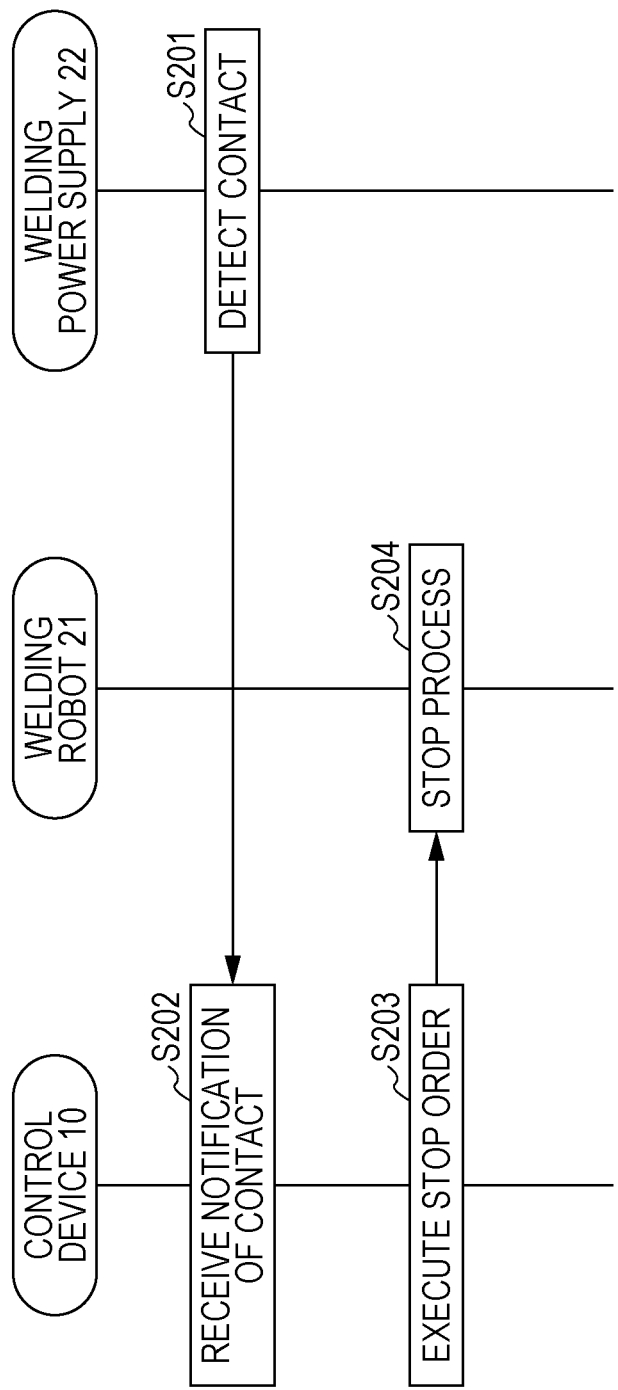
FIG. 7 is a diagram for describing an exemplary processing procedure for communication performed when a welding robot stops upon touch sensing.

FIG. 7 is a diagram for describing an exemplary processing procedure for communication performed when the welding robot 21 stops upon touch sensing. First, when the welding wire comes into contact with a workpiece, the welding power supply 22 detects a voltage drop due to the contact (step 201). Then, the welding power supply 22 stores monitor data for notification of the contact in a control instruction frame to thereby transmit the monitor data to the control device 10.

Next, when the control device 10 receives the monitor data for notification of the welding wire coming into contact with the workpiece (step 202), the control device 10 stores an order for stopping the operation of the welding robot 21 in a control instruction frame as command data for the welding robot 21. Then, the control device 10 transmits the control instruction frame to the welding robot 21 to execute the stop order (step 203). When the welding robot 21 receives the stop order, the welding robot 21 performs a process for stopping its operation (step 204).

Here, as illustrated in FIG. 5 and FIG. 6, in the communication intervals in a single synchronization interval, command data having the same content is usually generated for the same slave device 20. However, command data in which a bit portion corresponding to a stop order has a different value may be exceptionally generated even in a single synchronization interval. The slave device 20 that receives a stop order performs a process for stopping its operation. In the example illustrated in FIG. 7, two control instruction frames are transmitted and received in steps from 201 to 204; however, the content of command data differs between the two control instruction frames because the stop order is executed in step 203.

As described above, in steps from 201 to 204, transmission and reception of two control instruction frames are performed in the period from when the welding power supply 22 detects contact until when the welding robot 21 stops. Accordingly, a control instruction frame is transmitted and received for the welding robot 21 and the welding power supply 22 in all of the five communication intervals in the synchronization interval, and command data that reflects a stop order bit is transmitted in a communication interval subsequent to contact detected by the control device 10. As a result, the transmission/reception interval of the stop order becomes short, the period from when the welding power supply 22 detects contact until when the welding robot 21 stops is reduced, and highly precise touch sensing is performed.

Regarding arc tracking, as the communication intervals are shorter, the control device 10 receives position information about the welding torch of the welding robot 21 at shorter intervals, resulting in increased stability. Further, regarding the synchronization intervals, as the synchronization intervals are shorter, the transmission/reception interval of command data corresponding to each synchronization interval becomes short. Therefore, highly precise touch sensing is performed, and the stability of arc tracking increases. In a case where the synchronization intervals each have a length longer than 0 msec and equal to or shorter than 10 msec, for example, highly precise touch sensing and arc tracking are performed. In a case where the communication intervals each have a length longer than 0 msec and equal to or shorter than 5 msec, for example, highly precise touch sensing and arc tracking are performed.

Further, as illustrated in FIG. 7, in touch sensing, communication between the control device 10 and the welding robot 21 and welding power supply 22 is performed by using control instruction frames. Therefore, as the transmission/reception interval of a control instruction frame that stores command data for the welding robot 21 and command data for the welding power supply 22 is shorter, the precision of touch sensing increases. That is, as illustrated in FIG. 5 and FIG. 6, it is preferable that command data for the welding robot 21 and that for the welding power supply 22 be transmitted and received in all periods of the plurality of communication intervals set in a single synchronization interval.

Further, control instructions for the welding robot 21 and the welding power supply 22 are not limited to those for touch sensing, and are more important elements in a welding operation than control instructions for the other slave devices 20. Therefore, control instructions for the welding robot 21 and the welding power supply 22 are transmitted and received in all periods of the communication intervals to thereby facilitate a synchronous operation between the control device 10 and the welding robot 21 and welding power supply 22, resulting in an increase in welding operation quality.

<Description of Retransmission Process>

Now, a retransmission process performed in periodic communication is described. In periodic communication, in a case where transmission and reception of a control instruction frame fail, a retransmission process for a retry is performed. FIG. 8 to FIG. 11 are diagrams for describing exemplary processes in which a control instruction frame is transmitted and received in a retransmission process. In the examples illustrated in FIG. 8 to FIG. 11, it is assumed that each synchronization interval is 5 msec and each communication interval is 1 msec. Further, a case where command data is transmitted and received in all of the communication intervals in a single synchronization interval as in the case of the welding robot 21 illustrated in FIG. 5 and FIG. 6 is described.

Here, the slave devices 20 may have, in the period of each synchronization interval, a period (hereinafter referred to as an unusable range) during which received command data is unusable due to constraints of the slave devices 20. If one of the slave devices 20 receives a control instruction frame in the unusable range, command data in the control instruction frame is not used. In the examples illustrated in FIG. 8 to FIG. 11, the unusable range is present in the first communication interval, which is the initial communication interval, and in the fifth communication interval, which is the last communication interval, in each synchronization interval. The examples illustrated in FIG. 8 to FIG. 10 assume that the length of the unusable range is one-quarter of the communication interval (that is, 250 μsec), and the example illustrated in FIG. 11 assumes that the length of the unusable range is shorter than one-quarter of the communication interval. Under these assumptions, description is given.

Figure 8:
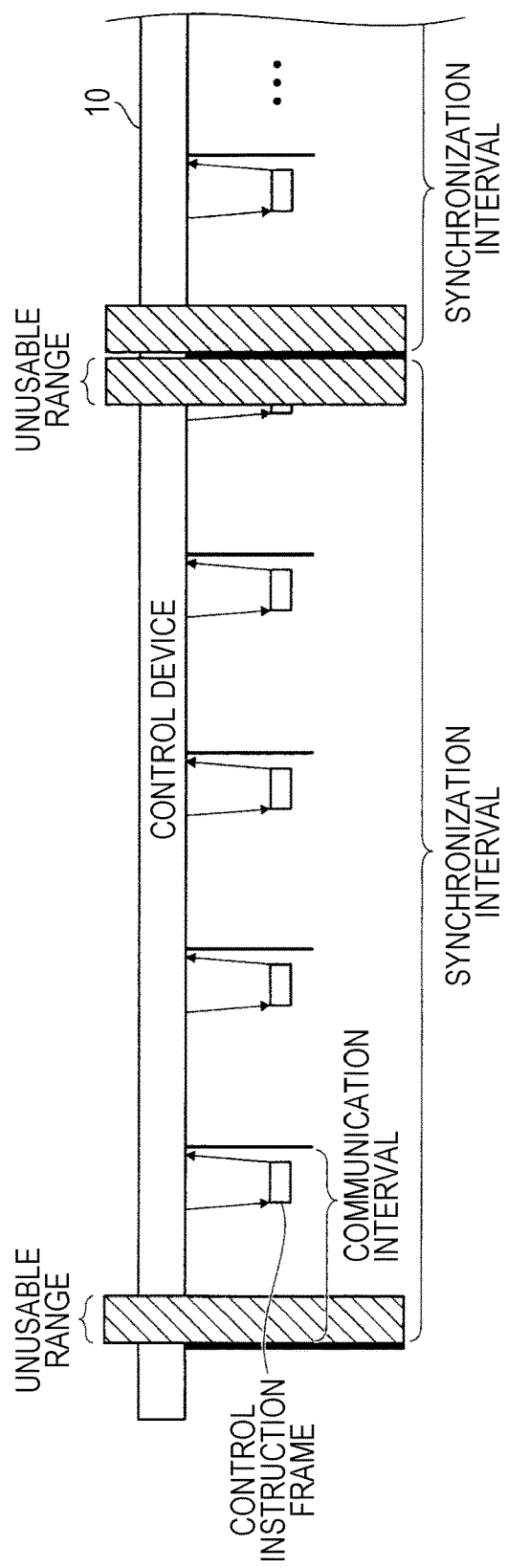
FIG. 8 is a diagram for describing an exemplary process in which a control instruction frame is transmitted and received in a retransmission process.

First, in the example illustrated in FIG. 8, a retransmission process is not performed, and transmission and reception of one control instruction frame are performed in each communication interval. Further, transmission and reception of a control instruction frame are performed in a period close to the end of each communication interval. That is, in a case where the communication interval is equally divided into three sections, namely, an "initial section", a "middle section", and an "end section" in this order, transmission and reception of a control instruction frame are performed in the third section, namely, the end section. Therefore, a control instruction frame received in the fifth communication interval in the synchronization interval falls within the unusable range and is not used.

Figure 9:
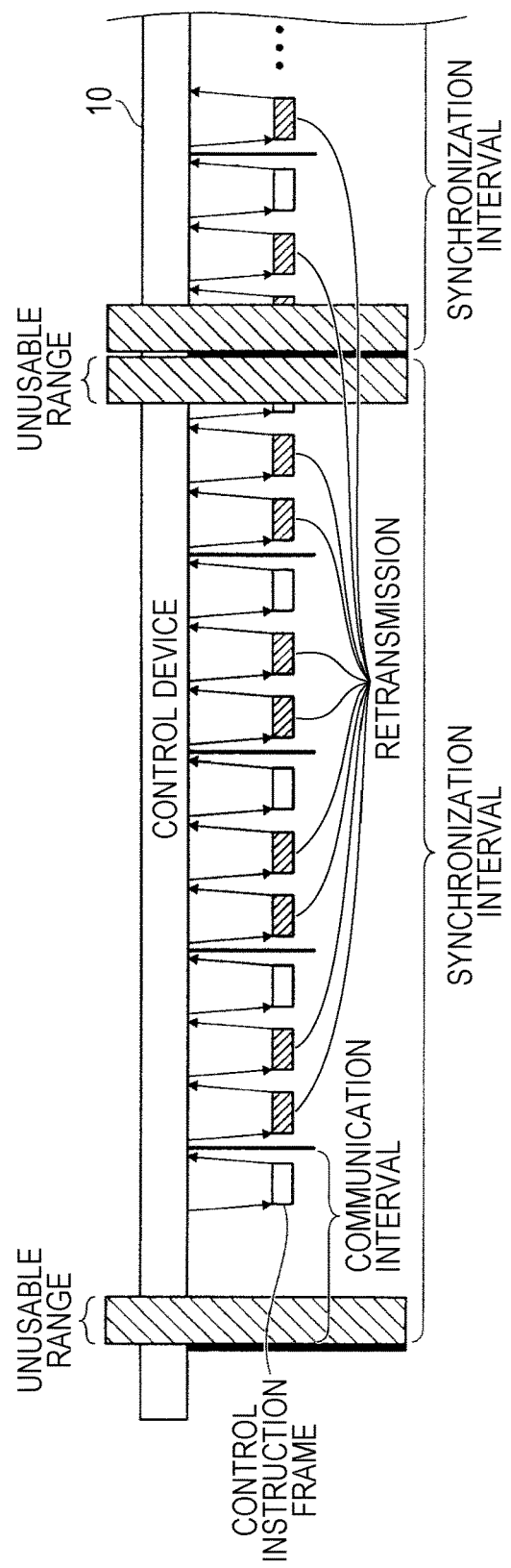
FIG. 9 is a diagram for describing an exemplary process in which a control instruction frame is transmitted and received in a retransmission process.

Next, the example illustrated in FIG. 9 illustrates a case where transmission and reception of a control instruction frame are performed in a period (end section) close to the end of each communication interval and a retransmission process is further performed. In the retransmission process, in response to failed transmission and reception of a control instruction frame, the control instruction frame is retransmitted twice at the maximum to complement the transmission and reception. Further, as in the example illustrated in FIG. 8, a control instruction frame transmitted in the fifth communication interval in the synchronization interval falls within the unusable range, and therefore, is not used.

Accordingly, the number of control instruction frames that are usable in the synchronization interval is twelve including the retransmitted frames.

Figure 10:
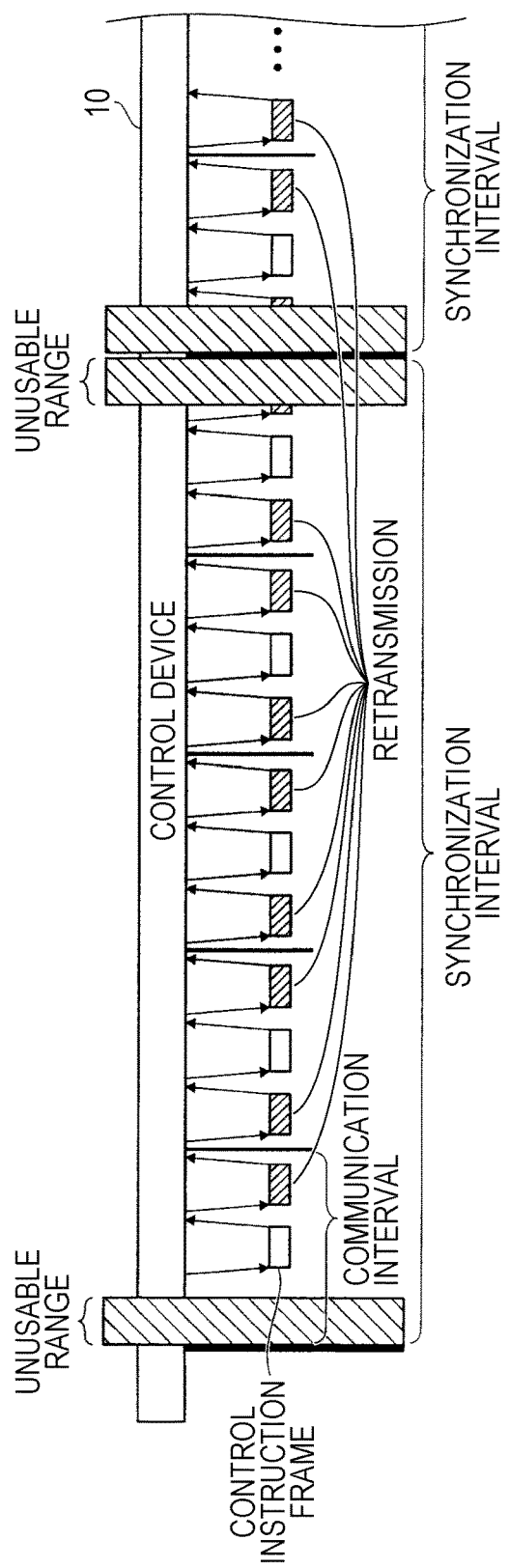
FIG. 10 is a diagram for describing an exemplary process in which a control instruction frame is transmitted and received in a retransmission process.

Meanwhile, the example illustrated in FIG. 10 illustrates a case where transmission and reception of a control instruction frame are performed in a period close to the center of each communication interval, and a retransmission process is further performed. That is, transmission and reception of a control instruction frame are performed in the middle section in a case where the communication interval is divided into three sections, and a retransmission process is further performed. In the retransmission process, a control instruction frame transmitted in the fifth communication interval in the synchronization interval does not fall within the unusable range, and therefore, is usable. Therefore, the number of control instruction frames that are usable in the synchronization interval is thirteen including the retransmitted frames. Accordingly, if transmission and reception of a control instruction frame are performed in a period (middle section) close to the center of each communication interval, the number of control instruction frames that can be transmitted and received in the synchronization interval may become larger than that in the case where transmission and reception of a control instruction frame are performed in a period (end section) close to the end of each communication interval as illustrated in FIG. 9, for example. If the number of control instruction frames that can be transmitted and received in the synchronization interval increases, command data is obtained more securely and synchronization control is performed more reliably.

That is, the unusable range is present also in the first communication interval, and therefore, the timings at which a control instruction frame is transmitted and received need to be set within a period immediately after the unusable range. In the example illustrated in FIG. 11, the length of each synchronization interval and that of each communication interval are the same as those in the examples illustrated in FIG. 8 to FIG. 10, and the unusable range is shorter than that in the examples illustrated in FIG. 8 to FIG. 10.

Figure 11:
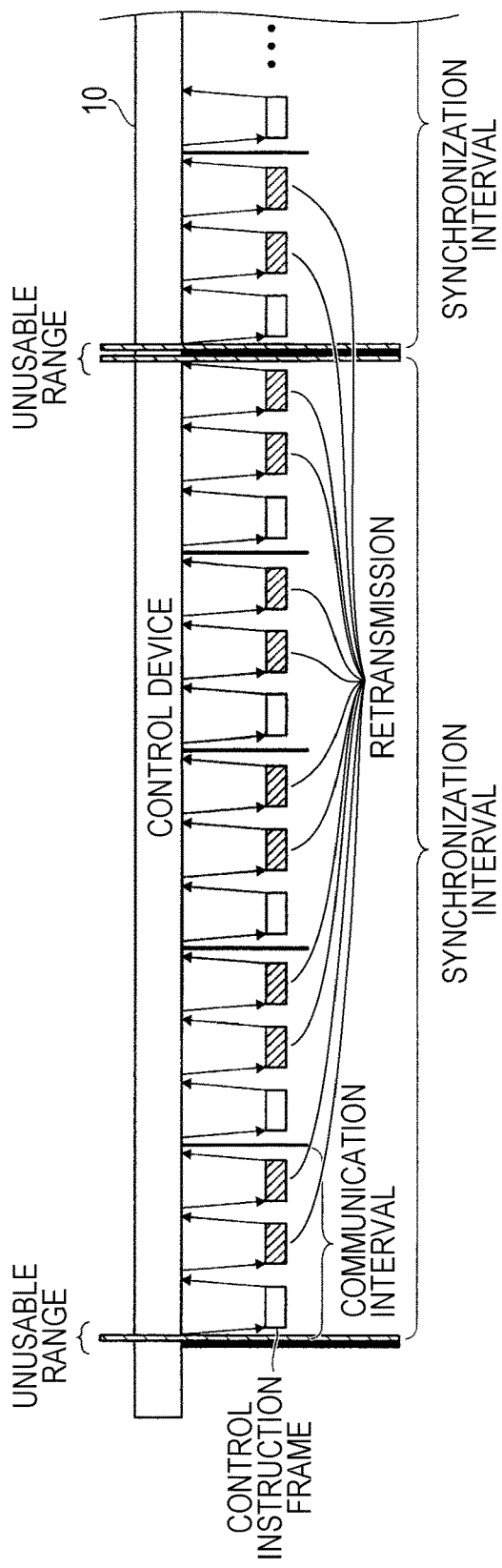
FIG. 11 is a diagram for describing an exemplary process in which a control instruction frame is transmitted and received in a retransmission process.

As illustrated in FIG. 11, if the unusable range is shorter than that in the cases of FIG. 8 to FIG. 10, when transmission and reception of a control instruction frame are performed in a period before the center of each communication interval, that is, in the initial section obtained by dividing the communication interval into three sections, a control instruction frame retransmitted in the fifth communication interval does not fall within the unusable range and is transmitted and received. Therefore, in the example illustrated in FIG. 11, the number of control instruction frames that are usable in the synchronization interval is fifteen including the retransmitted frames. In addition, as illustrated in FIG. 9 to FIG. 11, it is preferable that the timings at which a control instruction frame is transmitted and received be within the initial section, which is the first section, or the middle section, which is the second section, obtained by equally dividing the communication interval into three sections by taking into consideration a period for retransmitting a control instruction frame in a case where transmission and reception of the control instruction frame fail. Further, by taking into consideration a case where the unusable range is long, it is more preferable that the timings at which a control instruction frame is transmitted and received be within the middle section, which is the second section, obtained by equally dividing the communication interval into three sections.

Further, the length of the unusable range is determined for each of the slave devices 20 due to constraints of the slave device 20 as described above. Therefore, the timings at which a control instruction frame is transmitted and received are set on the basis of the longest unusable range among the unusable ranges of all of the slave devices 20 in the welding system 1, for example, so that the timings do not fall within the unusable range of any of the slave devices 20.

<Another Exemplary Configuration of Welding System>

Figure 12:
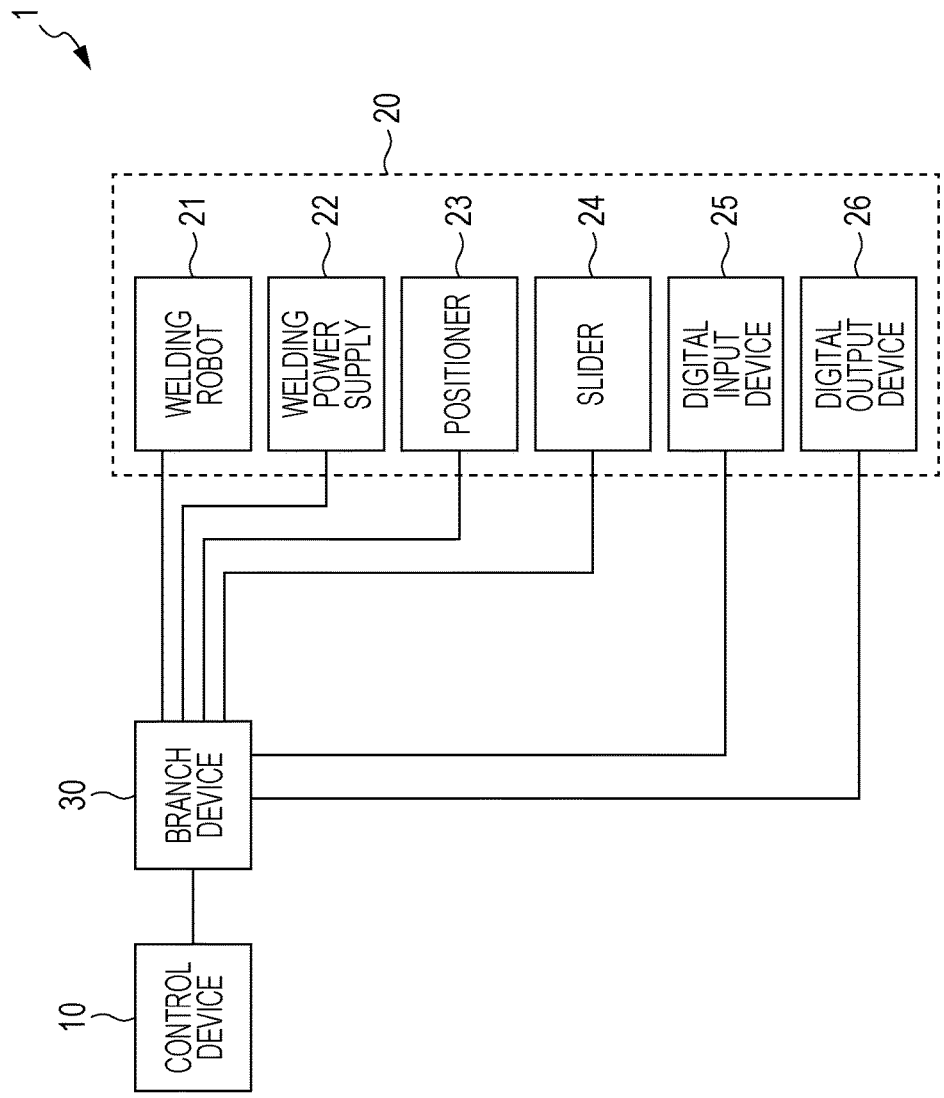
FIG. 12 is a diagram illustrating another exemplary configuration of the welding system according to the present embodiment.

Now, another exemplary configuration of the welding system 1 according to the present embodiment is described. FIG. 12 is a diagram illustrating another exemplary configuration of the welding system 1 according to the present embodiment. In the configuration illustrated in FIG. 12, a branch device 30 is newly provided in addition to the configuration illustrated in FIG. 1. The branch device 30 is provided between the control device 10 and the slave devices 20 on the network and is connected to the slave devices 20. Here, the welding system 1 illustrated in FIG. 1 is configured such that data generated by the control device 10 passes through the slave devices 20 sequentially, goes back over the slave devices 20, and returns to the control device 10. Meanwhile, in the welding system 1 illustrated in FIG. 12, communication from the control device 10 to the slave devices 20 is performed via the branch device 30.

For example, in a case where data is transmitted from the control device 10, the branch device 30 first receives the data. Thereafter, the branch device 30 transmits the received data to the welding robot 21 and receives again the data returned from the welding robot 21. Next, the branch device 30 transmits the data to the welding power supply 22 and receives again the data returned from the welding power supply 22. Accordingly, data transmitted from the control device 10 is first transmitted to the branch device 30, and thereafter, is transmitted from the branch device 30 to each of the slave devices 20 sequentially. When the branch device 30 transmits the data to the digital output device 26, which is the last one of the slave devices 20, and receives again the data returned from the digital output device 26, the branch device 30 returns the received data to the control device 10.

Here, in a case where the slave device 20 that is not normally operating, such as the slave device 20 for which the power is turned off or the slave device 20 in which an error occurs, is present, the control device 10 performs a process for disconnecting the slave device 20 that is not normally operating from the network. That is, the control device 10 controls the branch device 30 to disconnect the slave device 20 that is not normally operating from the network so as not to transmit data to the disconnected slave device 20.

Specifically, the control device 10 instructs the branch device 30 to, for example, shut off a port of the branch device 30 connected to the slave device 20 that is not normally operating. Therefore, in a case where the power of the welding power supply 22 is turned off, for example, the branch device 30 transmits data to the welding robot 21, and thereafter, transmits the data returned from the welding robot 21 to the positioner 23 instead of the welding power supply 22.

Figure 13:
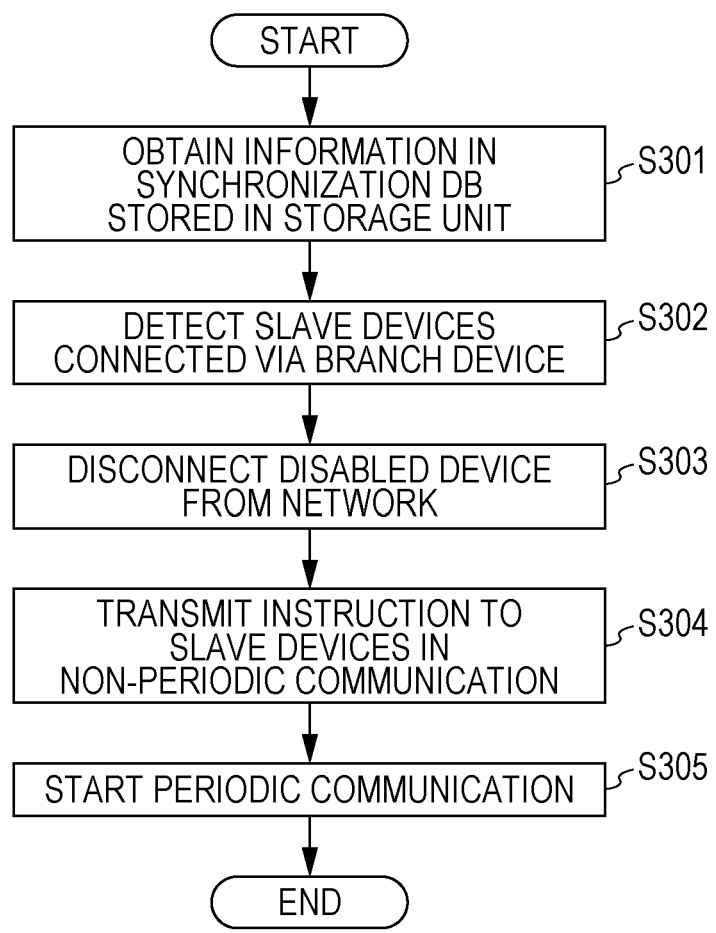
FIG. 13 is a flowchart illustrating an exemplary processing procedure for communication performed in the welding system illustrated in FIG. 12.

FIG. 13 is a flowchart illustrating an exemplary processing procedure for communication performed in the welding system 1 illustrated in FIG. 12.

First, when an operator turns on the power of the control device 10, the control instruction unit 11 of the control device 10 obtains information in the synchronization DB stored in the storage unit 12 (step 301). Next, the control instruction unit 11 detects the slave devices 20 connected via the branch device 30 (step 302). Then, the control instruction unit 11 determines the slave device 20 that is not normally operating on the network as a disabled device and controls the branch device 30 to perform a process for disconnecting the slave device 20 from the network (step 303).

Subsequently, the control instruction unit 11 transmits an instruction to the slave devices 20 via the communication unit 13 in non-periodic communication in order to perform parameter setting and parameter correction for the detected slave devices 20 (step 304). The instruction in non-periodic communication is first transmitted from the control device 10 to the branch device 30, and thereafter, is sequentially transmitted to the slave devices 20 other than the slave device 20 disconnected from the network in step 303. After parameter setting and correction have been performed for the slave devices 20 in accordance with the instruction in non-periodic communication, the control instruction unit 11 starts periodic communication (step 305).

In the periodic communication, the control instruction unit 11 generates a clock signal in each synchronization interval on the basis of the information in the synchronization DB as in step 104 illustrated in FIG. 4 and transmits the clock signal to the branch device 30. Further, the control instruction unit 11 generates a control instruction frame in each of the plurality of communication intervals set in a single synchronization interval on the basis of the information in the synchronization DB and transmits the control instruction frame to the branch device 30. The branch device 30 does not transmit the clock signal and the control instruction frame transmitted from the control device 10 to the slave device 20 disconnected from the network in step 303 but transmits the clock signal and the control instruction frame to the other slave devices 20 sequentially. After the control instruction frame has been transmitted to all of the slave devices 20 except for the slave device 20 disconnected from the network, the control instruction frame is returned from the branch device 30 to the control device 10.

Accordingly, in the welding system 1 illustrated in FIG. 12, data transmitted by the control device 10 is not transmitted to the slave device 20 that is not normally operating on the network and is transmitted to the other slave devices 20 sequentially. Here, in the welding system 1 illustrated in FIG. 1, the control device 10 is connected to the slave devices 20 sequentially, and therefore, if the power of one of the slave devices 20 is turned off, for example, synchronous control communication might not be performed across the welding system 1. On the other hand, in the configuration illustrated in FIG. 12, even in a case where the slave device 20 that is not normally operating is present in the welding system 1, a control instruction frame is transmitted to the other slave devices 20 that are normally operating. Therefore, the slave devices 20 that are normally operating are controlled so as to synchronously operate.

In the present embodiment, description is given of the case of synchronous control in a system for welding; however, the present embodiment is not limited to such a configuration. The present embodiment is applied to other systems that include an industrial robot.

The present invention has been described with reference to the embodiment; however, the technical scope of the present invention is not limited to the above-described embodiment. It is obvious to those skilled in the art that various modifications can be made or alternative modes can be employed without departing from the spirit and scope of the present invention.

REFERENCE SIGNS LIST

1 . . . welding system, 10 . . . control device, 11 . . . control instruction unit, 12 . . . storage unit, 13 . . . communication unit, 20 . . . slave device, 21 . . . welding robot, 22 . . . welding power supply, 23 . . . positioner, 24 . . . slider, 25 . . . digital input device, 26 . . . digital output device, 30 . . . branch device

The invention claimed is:

1. A communication control system comprising:
a control device; and
one or more control target devices connected to the control device over a network,
wherein the control device includes
a storage unit configured to store information including synchronization intervals and a plurality of communication intervals, synchronization intervals being periods for synchronization with the one or more control target devices, and the plurality of communication intervals being periods set in each of the synchronization intervals,
a control instruction unit configured to
generate control instructions for the respective control target devices instructing the one or more control target devices to synchronously operate, and
control a transmission and a reception of the control instructions between a communication unit and the one or more control target devices in each of the synchronization intervals by allocating each of the control instructions respectively corresponding to the one or more control target devices to at least one of the plurality of communication intervals set in each of the synchronization intervals, and transmitting and receiving, in each of the plurality of communication intervals, data including a corresponding one or more of the allocated control instructions, on the basis of the information stored in the storage unit.

2. The communication control system according to claim 1, wherein
the one or more control target devices include at least one industrial robot that is used in welding and at least one welding power supply, and
the control instruction unit performs transmission and reception of the control instructions respectively corresponding to the at least one industrial robot and the at least one welding power supply in all of the plurality of communication intervals set in each of the synchronization intervals.

3. The communication control system according to claim 1, wherein
the control instruction unit transmits to and receives from the one or more control target devices the corresponding one or more of the allocated control instructions in each of the plurality of communication intervals at timings that are within a first section or a second section among three sections obtained by equally dividing each of the plurality of communication intervals into three parts.

4. The communication control system according to claim 1, wherein
the synchronization intervals each have a length equal to or shorter than 10 msec, and the plurality of communication intervals each have a length equal to or shorter than 5 msec.

5. The communication control system according to claim 1, further comprising
a branch device provided between the control device and the one or more control target devices on the network and transmits the data transmitted from the control instruction unit of the control device to the one or more control target devices sequentially.

6. The communication control system according to claim 1, wherein
the network is constituted by a wired network.

7. The communication control system according to claim 1, wherein the control instructions include at least one of setting and correction of a parameter, the parameter being used in operations of the one or more control target devices.

8. The communication control system according to claim 1, wherein when a number of bytes of the control instruction exceeds a maximum capacity, the control instruction unit blocks the reception of the control instructions.

9. The communication control system according to claim 1, wherein the control instruction unit is further configured to perform a retransmission process when the transmission or the reception of the control instruction is failed.

10. The communication control system according to claim 2, wherein
the control instruction unit transmits to and receives from the one or more control target devices the corresponding one or more of the allocated control instructions in each of the plurality of communication intervals at timings that are within a first section or a second section among three sections obtained by equally dividing each of the plurality of communication intervals into three parts.

11. The communication control system according to claim 2, wherein
the synchronization intervals each have a length equal to or shorter than 10 msec, and the plurality of communication intervals each have a length equal to or shorter than 5 msec.

12. The communication control system according to claim 2, further comprising
a branch device provided between the control device and the one or more control target devices on the network and transmits the data transmitted from the control instruction unit of the control device to the one or more control target devices sequentially.

13. The communication control system according to claim 2, wherein
the network is constituted by a wired network.

14. The communication control system according to claim 7, wherein the transmission of the control instruction for the parameter setting and the parameter correction of the respective control target devices is based on a non-periodic transmission.

15. The communication control system according to claim 14, wherein the transmission and the reception of the control instruction is based on a periodic transmission after the parameter setting and the parameter correction of the respective control target devices.

16. A communication control method for communications and synchronizations of a control device and one or more control target devices, the method comprising the steps of:
generating control instructions for the respective control target devices instructing the one or more control target devices to synchronously operate;
controlling a transmission and a reception of the control instructions between a communication unit and the one or more control target devices in each synchronization interval, the synchronization interval being a predetermined period for synchronization between the control device and the one or more control target devices;
allocating each of the control instructions respectively corresponding to the one or more control target devices to at least one of a plurality of communication intervals, the plurality of communication intervals being periods set in each synchronization interval; and
transmitting and receiving, in each of the plurality of communication intervals, data including a corresponding one or more of the allocated control instructions.

* * * * *